United States Patent
Krajenke

(10) Patent No.: US 6,916,058 B2
(45) Date of Patent: Jul. 12, 2005

(54) LIFTING APPARATUS

(75) Inventor: Gary Walter Krajenke, Warren, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/673,759

(22) Filed: Sep. 29, 2003

(65) Prior Publication Data

US 2005/0067853 A1 Mar. 31, 2005

(51) Int. Cl.$^7$ ............................................. B60D 25/10
(52) U.S. Cl. ................................... 296/76; 296/100.07
(58) Field of Search .............................. 296/76, 100.06, 296/100.07, 100.08, 100.1, 107.08, 19; 414/462; 280/402; 254/126, 9 C; 100/35; 187/204, 205, 244; 182/63.1

(56) References Cited

U.S. PATENT DOCUMENTS

| | | | | |
|---|---|---|---|---|
| 3,700,124 A | * | 10/1972 | Lawrence | 296/100.07 |
| 4,078,269 A | * | 3/1978 | Weipert | 296/19 |
| 4,724,930 A | * | 2/1988 | VanLierop | 187/204 |
| 4,830,147 A | * | 5/1989 | Kawada | 187/205 |
| 5,002,258 A | | 3/1991 | Gruber | 254/126 |
| 5,074,000 A | * | 12/1991 | Soltani et al. | 254/9 C |
| 5,297,653 A | * | 3/1994 | Wurtz et al. | 187/244 |
| 5,458,316 A | * | 10/1995 | Engel | 254/126 |
| 5,681,074 A | * | 10/1997 | Christensen | 296/100.1 |
| 6,186,580 B1 | * | 2/2001 | Nothem et al. | 296/100.1 |
| 6,193,300 B1 | * | 2/2001 | Nakatomi et al. | 296/76 |
| 6,460,653 B1 | * | 10/2002 | Hardy et al. | 182/63.1 |
| 6,488,329 B1 | * | 12/2002 | Smith | 296/100.07 |
| 6,578,899 B2 | * | 6/2003 | Hasselgruber et al. | 296/76 |
| 6,705,662 B2 | * | 3/2004 | Sande | 296/76 |
| 6,705,663 B2 | * | 3/2004 | Zipperle | 296/76 |
| 2002/0056377 A1 | * | 5/2002 | Gawley et al. | 100/35 |

* cited by examiner

Primary Examiner—Kiran B. Patel
(74) Attorney, Agent, or Firm—Laura C. Hargitt

(57) ABSTRACT

A lifting apparatus for lifting and lowering a component of an automobile body that is hingedly and releasably attached to the automobile body at first and second attachment points. The lifting apparatus includes an extension member having first and second ends that is operable to move from a normally retracted position to an extended position. The first end of the extension member is pivotally attached to the component at a third attachment point and the second end of the extension member is pivotally attached to the automobile body. An actuator is operable to extend and retract the extension member. When a one of the first and second attachment points is released, the extension member moves from the retracted position to the extended position and moves the component to an open position about the other of the first and second attachment points.

10 Claims, 4 Drawing Sheets

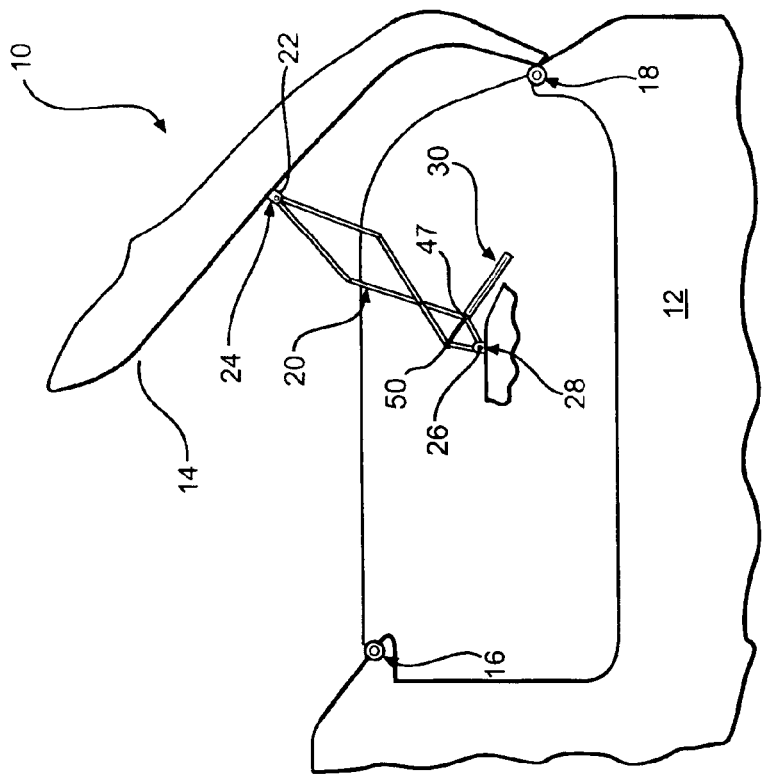
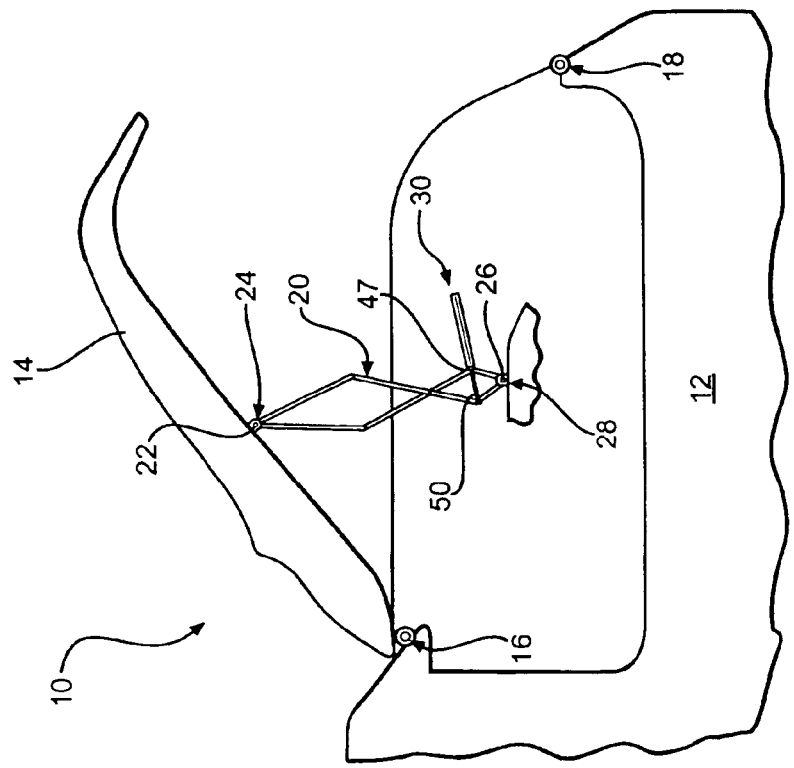
FIG - 4
FIG - 3

LIFTING APPARATUS

BACKGROUND OF THE INVENTION

The present invention relates in general to lift mechanisms and, in particular, to a lifting apparatus for lifting a moveable body component away from an automobile body.

Automotive lift mechanisms are well known and are utilized for moving a body component, for example, a vehicle swinging panel such as vehicle rear doors and lift gates that are hinged to a vehicle body. The components to be lifted are typically attached at and pivot about a single axis when lifted to allow access to the trunk or vehicle interior. Recent innovations in automotive accessories include retractable devices, such as a retractable vehicle hard top, that are designed to be stowed adjacent the trunk lid of vehicles. These retractable devices are preferred to be stowed utilizing existing vehicle body components, such as the vehicle trunk lid. In order to stow the retractable device and continue to function as a trunk lid, however, the trunk lid must be hingedly and releasably attached to the vehicle body at more than one location. The prior art retractable devices utilize a plurality of lifting apparatus for this function, disadvantageously occupying interior space and adding weight to the vehicle.

It is desirable, therefore, to provide a lifting apparatus to lift a component that is hingedly and releasably attached to a vehicle body at a plurality of locations and that efficiently utilizes a minimal amount of input energy.

SUMMARY OF THE INVENTION

A lifting apparatus for lifting and lowering a component of an automobile body which component is hingedly and releasably attached to the automobile body at first and second attachment points. The apparatus includes an extension member having first and second ends that is operable to move from a normally retracted position to an extended position. The first end of the extension member is pivotally attached to the component at a third attachment point and the second end of the extension member is pivotally attached to the automobile body. An actuator is operable to extend and retract the extension member. When a one of the first and second attachment points is released, the extension member moves from the retracted position to the extended position and moves the component to an open position about the other of the first and second attachment points.

The actuator may be, but is not limited to, a hydraulic piston, a pneumatic piston or an electrically driven motor that applies a force to the extension member and causes the component to rise to a specific open position. Upon reversal of the actuator, the present invention retracts, causing the component to lower to a specific closed position. By providing a single actuator, the present invention allows the component to be lifted and lowered with power assistance.

The present invention assists in the raising and lowering of the component by utilizing an extension member that has extended travel capability with short travel inputs from the actuator. The short travel input of the extension member advantageously allows the extension member to be packaged easily within the automobile body while also providing the extended travel capability. Preferably, the extension member is a scissor jack extension member. Alternatively, the extension member is a telescoping hydraulic piston or similar extension member having extended travel capability with short travel inputs.

Preferably, the third attachment point is located close to the center of gravity of the component, which advantageously requires less energy to lift and lower the component due to the increased lever arm. The travel length and time for each independent closure event can also be controlled by specific programming within a Body Computer Module (BCM) based on which of the first and second attachment points is electronically released.

The present invention will function with either single or multi-pivoted hinges. The present invention advantageously reduces the cost of supplemental energy needs by utilizing a single actuator, provides a design solution for future closures that require dual-acting hinging, reduces the vehicle cost and mass by eliminating structural reinforcements in high load-bearing joints while also providing a power-assisted conventional lifting trunk or deck lid.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is a view of the apparatus of FIG. 1 with the component shown in a first open position;

FIG. 4 is a view of the apparatus of FIG. 1 with the component shown in a second open position.

DESCRIPTION OF THE PREFERRED EMBODIMENT

Figure 1:
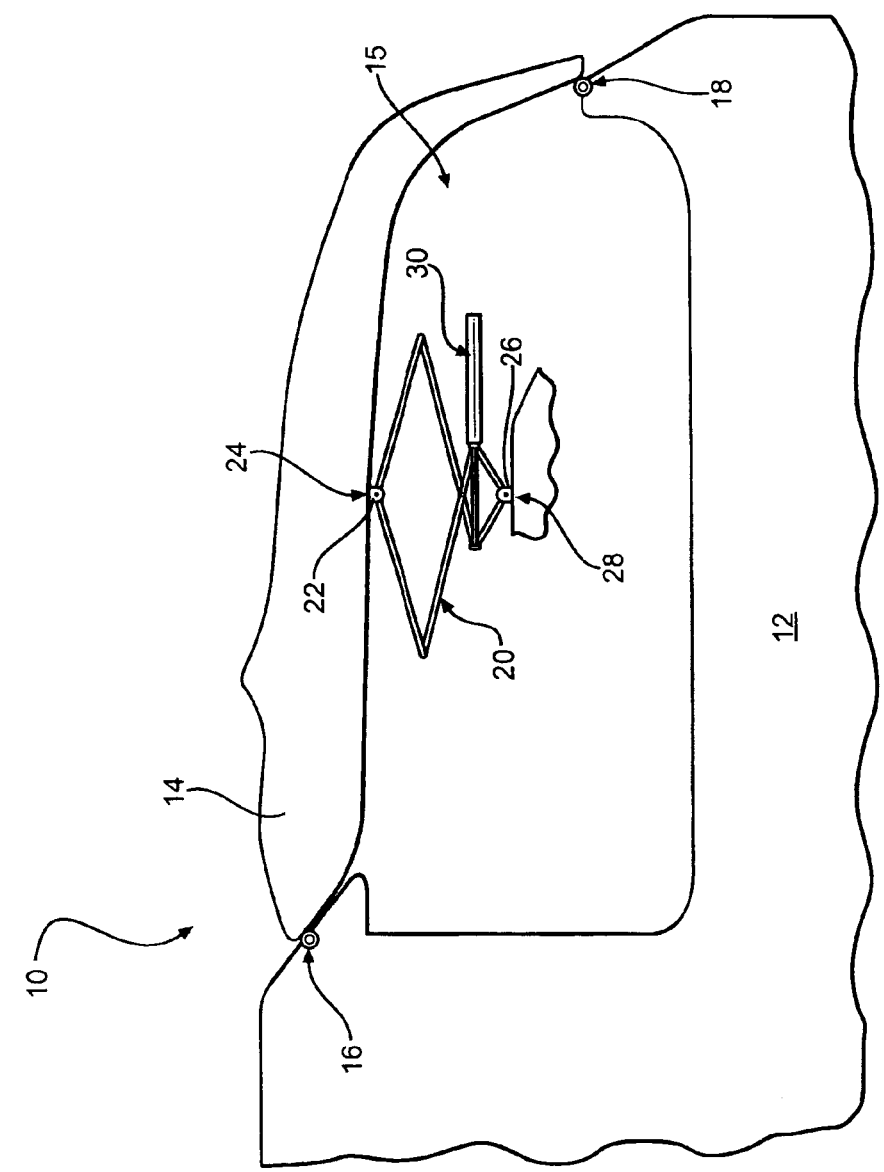
FIG. 1 is a side elevation view of an apparatus in accordance with the present invention shown in a closed position attached to a body component and installed in a trunk portion of a vehicle body.

Referring now to FIG. 1, a lifting apparatus in accordance with the present invention is indicated generally at 10. The lifting apparatus 10 is adapted to be attached to an automobile body 12 or any other type of body having a moveable closure. Only a rear portion of the vehicle body 12 is shown in side elevation with the near side removed to expose the interior thereof. The apparatus 10 is representative of two such devices which would be mounted at opposite sides of the vehicle body. The lifting apparatus 10 is attached to a moveable body component 14, such as a trunk lid, a deck lid or the like. The component 14 is attached to the automobile body 12 at a first latch or attachment point 16 and a second latch or attachment point 18 on opposing ends thereof. The first attachment point 16 and the second attachment point 18 are preferably hinged and releasable latches, discussed in more detail below. The component 14 releasably encloses a compartment 15 formed in the automobile body 12, such as a trunk space or the like.

A first end 22 of an extension member 20 is attached to the component 14 at a third attachment point 24. The third attachment point 24 is a pivoting attachment. A second end 26 of the extension member 20 is attached to the automobile body at a body attachment point 28 in the compartment 15. The body attachment point 28 is a pivoting attachment. An actuator 30 is attached to the extension member 20 intermediate the first end 22 and the second end 26 and is operable to move the extension member 20 from a retracted position to a extended position, discussed in more detail below.

Figure 2:
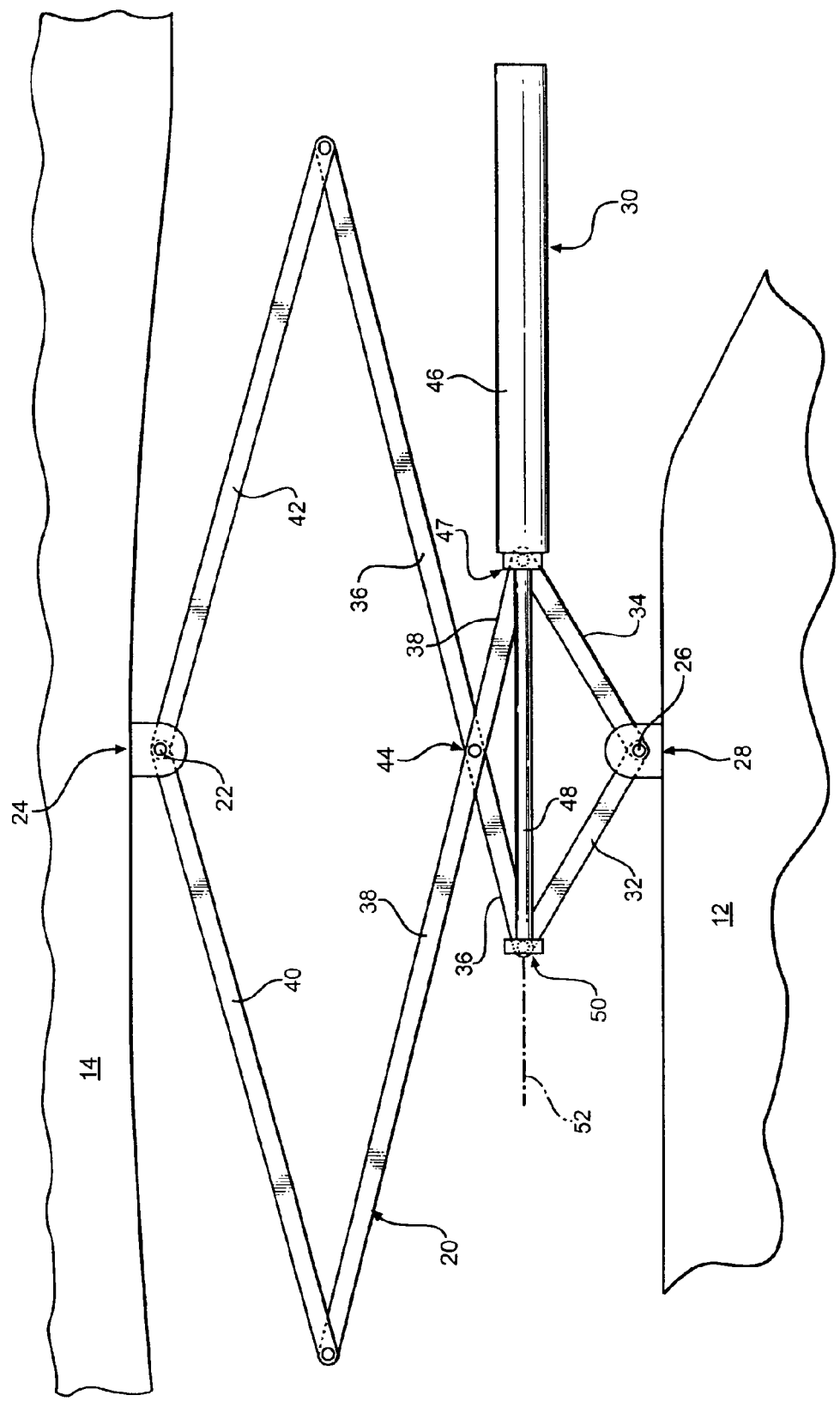
FIG. 2 is an enlarged view of the apparatus of FIG. 1 showing an extension member and actuator.

Referring now to FIG. 2, the extension member 20 is shown in more detail. The extension member 20 is preferably a scissor jack extension member having a plurality of hingedly or pivotally attached cross bar or scissor arm portions, discussed in more detail below. Alternatively, the extension member 20 is a telescoping hydraulic cylinder or similar type mechanism or apparatus that has extended travel capability with short travel inputs.

In an embodiment shown in FIG. 2, a first scissor arm 32 and a second scissor arm 34 are hingedly attached to the body attachment point 28 at respective first ends thereof to form the second end 26 of the extension member 20. The respective second ends of the first scissor arm 32 and the second scissor arm 34 are attached to respective first ends of a third scissor arm 36 and a fourth scissor arm 38. The respective second ends of the third scissor arm 36 and the fourth scissor arm 34 are hingedly attached to a respective first end of a fifth scissor arm 40 and a sixth scissor arm 42. The respective second ends of the fifth scissor arm 40 and the sixth scissor arm 42 are attached to the third attachment point 24 to form the first end 22 of the extension member 20. The third scissor arm 36 and the fourth scissor arm 38 are hingedly attached intermediate their respective first and second ends at an intermediate attachment point 44.

The actuator 30 is preferably a hydraulic piston and cylinder assembly that includes a cylinder body 46 having a piston 48 slidably disposed therein and movable along a longitudinal axis 52 thereof. A free end of a rod of the piston 48 is attached at a pivot point 50 where the second end of the first scissor arm 32 and the third scissor arm 36 are hingedly attached. An end of the cylinder 46 from which the rod of the piston 48 extends is attached at a pivot point 47 where the second end of the second scissor arm 34 and the first end of the fourth scissor arm 38 are hingedly attached. In an alternative embodiment, the actuator 30 is a double-acting solenoid assembly (not shown) having a plunger extending therefrom used as a push and pull mechanism that is operable to move the extension member 20 to an extended position and to a retracted position. Alternatively, the actuator 30 is a pneumatic piston, an electric motor or the like, which is operable to move the extension member 20 from the retracted position to the extended position.

The extension member 20 is operable to move from a first, retracted position, as shown in FIG. 1, to a second extended position, discussed in more detail below. In the retracted position, the component 14 is attached to the body 12 at both the first attachment point 16 and the second attachment point 18, best seen in FIG. 1.

Figure 5:
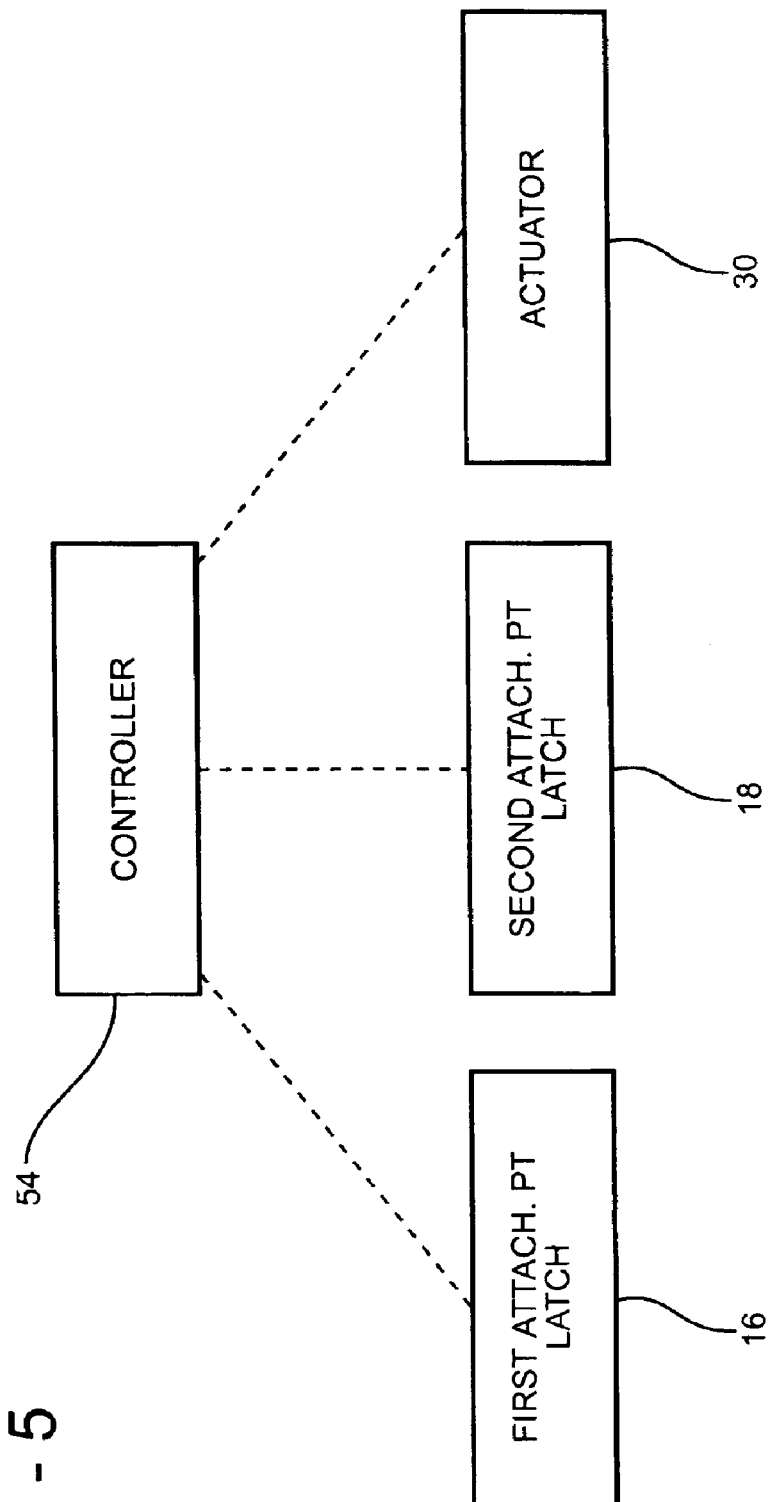
FIG. 5 is a block diagram showing a controller for the apparatus of FIG. 1 in accordance with the present invention.

Referring now to FIG. 5, a controller 54, such as a Body Computer Module (BCM) or similar controlling means, is shown electrically connected to a latch of the first attachment point 16, a latch of the second attachment point 18, and the actuator 30. The controller 54 is operable to selectively release and engage the latches of the first 16 and second 18 attachment points. The controller 54 is operable to selectively energize and deenergize the actuator 30 in order to provide a force to move the extension member 20 between the retracted position to the extended position, discussed in more detail below.

Referring now to FIGS. 1, 2 and 5, the operation of the apparatus 10 will now be described. In FIG. 1, the component 14 is at rest in a closed position and is attached to the body 12 at both the first attachment point 16 and at the second attachment point 18. In the closed position of the component 14, the extension member 20 is in the retracted position, providing a relatively small amount of distance between the first end 22 and the second 26. In the retracted position, the pivot point 50 at the free end of the piston 48 is extended away from the pivot point 47 of the cylinder 46. When the component 14 is required to be moved to an open position, the controller 54 sends a signal to release a one of the first attachment point 16 and the second attachment point 18. After either the first attachment point 16 or the second attachment point 18 is released, the controller 54 sends a signal to energize the actuator 30. The actuator 30 retracts the piston 48 from its extended position toward the pivot point 47 of the cylinder 46 along the longitudinal axis 52. As the piston 48 retracts, the scissor arms 32, 34, 36, 38, 40, and 42 are moved as well elongating the extension member 20 in a generally vertical direction. The actuator 30 continues to extend the extension member 20 until the controller 54 sends another signal to stop movement of the piston 48 and the extension member 20, such as when the component 14 has reached a predetermined open position.

Referring now to FIG. 3, the apparatus 10 is shown in a first open position. In the first open position, the component 14 has been released from the second attachment point 18. In this position, the component 14 has pivoted about the first attachment point 16 and the extension member 20 is in the extended position, providing a relatively large amount of distance between the first end 22 and the second end 26. The free end of the piston 48 is in a retracted position, with the pivot point 50 close to the pivot point 47.

As the actuator 30 provides a force to the extension member 20, the extension member 20 elongates between the body 12 and the component 14 and the component 14 pivots about the first attachment point 16 and moves away from the body 12. While elongating, the extension member 20 pivots on the third attachment point 24 and the body attachment point 28 in response to the pivoting movement of the component 14. In the first open position, the compartment 15 is exposed adjacent the second attachment point 18.

Referring now to FIG. 4, the apparatus 10 is shown in a second open position. In the second open position, the component 14 has been released from the first attachment point 16. In this position, the component 14 has pivoted about the second attachment point 18 and the extension member 20 is in the extended position, providing a relatively large amount of distance between the first end 22 and the second end 26. The free end of the piston 48 is in the retracted position.

As the actuator 30 provides a force to the extension member 20, the extension member 20 elongates between the body 12 and the component 14 and the component 14 pivots about the second attachment point 18 and moves away from the body 12. While elongating, the extension member 20 pivots on the third attachment point 24 and the body attachment point 28 in response to the movement of the component 14. In the second open position, the compartment 15 is exposed adjacent the first attachment point 16.

When the component 14 is required to be moved from either the first open position or the second open position to the closed position, the controller 54 sends a signal to energize the actuator 30. The actuator 30 extends the piston 48 from its retracted position to retract the extension member 20. When the component 14 is adjacent each of the attachment points 16 and 18, the controller 54 sends a signal to engage the first attachment point 16 and the second attachment point 18, attaching the component 14 to the body 12. In the case of either a hydraulic or pneumatic actuator 30, a quick release or dumping of the working fluid when the component 14 is near the first attachment point 16 or the second attachment point 16 can be provided to assist in the latching of the component 14 to the body 12.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A lifting apparatus adapted to pivot a component hingedly attached to a vehicle body, comprising:

the component having first and second attachment means for hingedly and releasably attaching said component to the vehicle body;

an extension member having first and second ends and being operable to move from a normally retracted position to an extended position, said first end of said extension member being pivotally attached to said component and said second end of said extension member being adapted to be pivotally attached to the vehicle body; and an actuator, attached to said extension member, for moving said extension member between the retracted position and the extended position, whereby when said component is hingedly attached to the vehicle body by said first and second attachment means in a closed position and said second end of said extension member is pivotally attached to the vehicle body, said extension member is in the retracted position, and when one of said first and second attachment means is released and said extension member is moved to the extended position by said actuator, said component is pivoted at the other one of said first and second attachment means to an associated one of two open positions.

2. The apparatus according to claim 1 wherein said extension member is a scissor jack extension member.

3. The apparatus according to claim 1 wherein said extension member is attached to said component close to a center of gravity of said component.

4. The apparatus according to claim 1 wherein said actuator is a hydraulic piston and cylinder assembly.

5. The apparatus according to claim 4 wherein said cylinder and said piston are each pivotally attached to said extension member.

6. The apparatus according to claim 1 including a controller connected to said actuator and said first and second attachment means for selectively controlling said actuator and for selectively releasing said first and second attachment means.

7. The apparatus according to claim 6 wherein said controller is a Body Control Module.

8. The apparatus according to claim 1 wherein said first and second attachment means hingedly and releasably attach said component to the vehicle body at first and second attachment points respectively and said first end of said extension member is pivotally attached to said component at a third attachment point, wherein said third attachment point is intermediate said first and second attachment points.

9. The apparatus according to claim 1 wherein said component is adapted to enclose a compartment in the vehicle body in the closed position.

10. The apparatus according to claim 1 wherein said component is a trunk lid.

\* \* \* \* \*